2,854,376
ANTACID COMPOSITION

Leo L. Hardt, Chicago, Ill., assignor to Hardt Foundation, Chicago, Ill., a corporation of Illinois No Drawing. Application September 7, 1954
Serial No. 454,593

3 Claims. (Cl. 167—55)

This invention relates to a pharmaceutical composition particularly useful in the treatment of peptic ulcers, both of the duodenal or gastric type, by oral administration.

An ulcer is an area of the stomach where the mucous lining has been digested. Hydrochloric acid from the stomach irritates the ulcer, causing pain.

Any composition of this character must have as its primary object the protection of the ulcer from the acids of the gastric juices by spreading over large areas of the gastric mucosa, thereby allowing the ingredients of the composition to act locally on the mucosa for as long a period of time as possible, usually two or more hours, and inhibit gastric motility, inhibit enzyme action, and inhibit excess secretion and acidity.

Because such compositions should be administered while the stomach is empty, one-half hour to an hour before meals and at bedtime, the composition must preferably be of ingredients which will disintegrate almost instantaneously in the stomach, and immediately spread over the acid producing cells by adhering to the gastric mucosa.

A composition for this purpose should also be effective in reducing hydrochloric acid production of the secreting gastric mucosa, both in volume of acid as well as concentration.

Dilution by food and drink may prevent uniform results, and therefore the optimal time for administration is while the stomach is empty.

Studies have been made relative to the inhibition of gastric acid production in dogs with sodium lauryl sulfate, and I have discovered that sodium lauryl sulfate when introduced into the stomach of a dog (either as a wet solution or as a dry substance), produces complete inhibition of normal gastric motility for periods up to ninety minutes; will inhibit hydrochloric acid production for approximately six hours, and is nontoxic.

Such studies have also been carried on with human beings, and show that the administration of two to six tablets of a size which can be conveniently swallowed, each containing about 250 mg. sodium lauryl sulfate, 50 to 100 mg. refined oatmeal gum, and about 50 to 150 mg. guar gum, uniformly result in the inhibition of motility, inhibition of enzymes, and inhibition of acidity for about two hours or more.

The guar gum and oatmeal gum provide a rapidly disintegrating vehicle in the stomach for carrying the sodium lauryl sulfate and slowly and continuously releasing the same. Guar gum has the characteristic of remaining mucin-like or mucilaginous-like in high concentrations of hydrochloric acid for long periods of time and thus in the stomach will spread over and adhere to the mucosa. A suitable refined oatmeal gum is a preparation known in the trade as "Aveeno," and has the characteristic of acting as a binder when the ingredients are compressed into tablet form.

When the sodium lauryl sulfate is administrated in liquid form, a solution containing about 1½ grams of sodium lauryl sulfate is given, because of its unpalatability, through a Levine tube.

Percentage-wise, the composition in dry form would contain from ½% to 3% by weight of sodium lauryl sulfate, the active ingredient, and the oatmeal gum and guar gum in substantially equal quantities sufficient to be compressed into a tablet of a size which can be easily swallowed. The tablets may be prepared by any process well known in the pharmaceutical trade.

Such tablets given approximately fifteen minutes to an hour before histamine injection in the empty human stomach, or the empty dog stomach, will prevent the normal histamine reaction which occurs, namely, a rise in the concentration of acid as well as the volume of the secretion.

Motility studies after administering the tables indicate in the dog as well as the human stomach a definite inhibition of gastric motility.

I have also discovered that gastric animal mucin has the characteristic of remaining mucilaginous-like in the presence of the normal acid concentrations of the stomach, and may be substituted for the guar gum to spread over the gastric mucosa and slowly release the sodium lauryl sulfate.

I claim:

1. A pharmaceutical composition for oral administration in the treatment of peptic ulcer, consisting, in single dosage form of a mixture including sodium lauryl sulfate ½% to 3% by weight, and oatmeal gum and guar gum in substantially equal quantities sufficient to be compressed into a tablet of a size which may be easily swallowed for inhibiting gastric motility.

2. A pharmaceutical compositoin for oral administion in a single dosage in the treatment of peptic ulcer, consisting of a mixture including sodium lauryl sulfate 500 to 1500 mg., oatmeal gum 100 to 600 mg. and guar gum 100 to 900 mg. for inhibiting gastric motility.

3. A pharmaceutical composition for oral administration in a single dosage for the treatment of peptic ulcer, consisting of a mixture of substantially two parts sodium lauryl sulfate, one part oatmeal gum, and one part guar gum, compressed into a tablet of a size which may be easily swallowed.

References Cited in the file of this patent

UNITED STATES PATENTS

| 2,477,080 | Necheles | July 26, 1949 |
| 2,774,710 | Thompson | Dec. 18, 1956 |

FOREIGN PATENTS

| 880,632 | Germany | June 22, 1953 |

OTHER REFERENCES

Fogelson: Archives of Internal Med., March 1944, pp. 212–216.

Lobstein: Am. J. of Digestive Diseases, vol. 18, July 1951, pp. 214 and 215.

Gross: J. of the Am. Pharm. Asso., Sci. Ed., vol. 41, March 1952, pp. 157–161.

Steigmann, Hardt and Hyman: Am. J. of Digestive Diseases, vol. 19, October 1952, pp. 310–315.

De Courcy: Staff Conf. of the De Courcy Clinic, Bull. No. 26, June 15, 1954, pp. 7 and 8.

Hardt, Steigmann, Maaske and Grover: Therapy of Peptic Ulcer, Sci. Exhibit, Clinical Meeting, A. M. A., December 1953 (6 pp.).

Osborne: Bull. Nat. Formulary Comm., vol. 19, Jan.-Feb. 1951, pp. 4–12.